United States Patent [19] [11] 3,876,715
McNulty et al. [45] Apr. 8, 1975

[54] PROCESS FOR PREPARING 2,3-DIBROMO-2-ALKYLALKANES
[75] Inventors: John G. McNulty, Glenshaw, Pa.; Glen A. Russell, Ames, Iowa; William L. Walsh, Glenshaw, Pa.
[73] Assignee: Gulf Research & Development Company, Pittsburgh, Pa.
[22] Filed: Dec. 1, 1972
[21] Appl. No.: 311,368

[52] U.S. Cl............................................. 260/658 R
[51] Int. Cl.............................................. C07c 17/10
[58] Field of Search ................................ 260/658 R

[56] References Cited
UNITED STATES PATENTS
1,102,654  7/1914  Groul............................ 260/658 R OTHER PUBLICATIONS
Russell and Brown, JACS, 77, p. 4030 (1955) QD1A5.
Hughes, Ingold and Scott, J. Chem. Soc. of London, (1937), pp. 1274–1276 QD1C6.

Primary Examiner—Delbert E. Gantz
Assistant Examiner—Joseph A. Boska

[57] ABSTRACT

A process for preparing 2,3-dibromo-2-alkylalkanes while inhibiting the formation of 2,3,3-tribromo-2-alkylalkanes which comprises reacting a 2-bromo-2-alkylalkane with bromine in the presence of HBr in a substantially anhydrous reaction system.

8 Claims, No Drawings

PROCESS FOR PREPARING 2,3-DIBROMO-2-ALKYLALKANES

This invention relates to a process for preparing 2,3-dibromo-2-alkylalkanes while inhibiting the formation of 2,3,3-tribromo-2-alkylalkanes.

When a 2-bromo-2-alkyalkane is reacted with bromine to form a 2,3-dibromo-12-alkylalkane undesirable amounts of 2,3,3-tribromo-2-alkylalkanes are also formed. For example, Russell and Brown (J.A.C.S., Aug. 5, 1955, page 4030) reacted equimolar quantities (0.25 mol) of bromine and t-amylbromide (2-bromo-2-methylbutane) in 120 grams of carbon tetrachloride to give 34 grams of 2,3-dibromo-2-methylbutane (59 per cent yield) and 8.5 grams of 2,3,3-tribromo-2-methylbutane (11 per cent yield). The presence of the carbon tetrachloride effectively removes formed hydrogen bromide from further reaction. Carbon tetrachloride has been used because of the belief that the removal of hydrogen bromide promotes the bromination reaction. Shriner and Fusan (Identification of Organic Compounds, pages 93 and 94, John Wiley and Sons, Third Edition, 1948) state: "Carbon tetrachloride is a good solvent for bromine and for many organic compounds but does not dissolve hydrogen bromide." Reducing the amount of 2,3,3-tribromo-2-alkylalkanes is important. For example, 2-bromo-2-methylbutane can be reacted with bromine to form 2,3-dibromo-2-methylbutane which, in turn, can be dehydrobrominated to form isoprene. To the extent 2,3,3-tribromo-2-methylbutane is also formed during the course of the reaction, obviously reduced amounts of 2,3-dibromo-2-methylbutane are obtained for use in the production of isoprene.

We have found that a 2-bromo-2-alkylalkane can be reacted with bromine to form 2,3-dibromo-2-alkylalkane while inhibiting the formation of 2,3,3-tribromo-2-alkylalkane by the relatively simple expedient of carrying out the reaction in the presence of HBr while maintaining the reaction system substantially anhydrous. That HBr would have the desired effect herein of inhibiting formation of 2,3,3-tribromo-2-alkylalkane is surprising in view of the fact that in the reaction of a 2-bromo-2-alkylalkane with bromine HBr is formed as a side product.

The 2-bromo-2-alkylalkanes that can be used herein can be defined by the following structural formula:

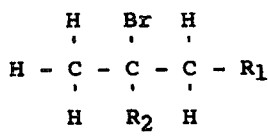

wherein $R_1$ and $R_2$, the same or different, are alkyl groups having from one to five carbon atoms, preferably from one to three carbon atoms, specific examples of which are methyl, ethyl, propyl, isopropyl, butyl, isobutyl, t-butyl, amyl, isoamyl and t-amyl.

The desired 2,3-dibromo-2-alkylalkane and undesired 2,3,3-tribromo-2-alkylalkane resulting from reaction of the 2-bromo-2-alkylalkane with bromine can be illustrated by the following formulae, respectively,

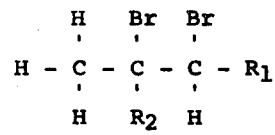

and

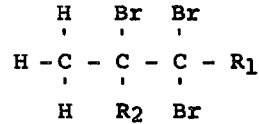

wherein $R_1$ and $R_2$ are as defined above. In a preferred embodiment herein 2-bromo-2-methylbutane is reacted with bromine to form 2,3-dibromo-2-methylbutane while inhibiting the formation of 2,3,3-tribromo-2-methylbutane. Specific examples of 2-bromo-2-alkylalkanes that can be used as charge herein include 2-bromo-2-methylbutane, 2-bromo-2-ethylbutane, 2-bromo-2-propylbutane, 2-bromo-2-butylbutane, 2-bromo-2-amylbutane, 2-bromo-2-isopropyl-butane, 2-bromo-2-t-butylbutane, 2-bromo-2-isobutylbutane, 2-bromo-2-isoamylbutane, 2-bromo-2-t-amylbutane, 2-bromo-2-methylhexane, 2-bromo-2-ethylhexane, 2-bromo-2-propylheptane, 2-bromo-2-butyl-heptane, 2-bromo-2-isopropylheptane, 2-bromo-2-amylheptane, 2-bromo-2-isobutylhexane, etc.

The reactants can be employed over a wide range. Thus, the molar ratio of 2-bromo-2-alkylalkane to bromine can be from about 100:1 to about 1:1, but, in general, can be from about 50:1 to about 20:1. The amount of HBr relative to the 2-bromo-2-alkylalkane necessary to inhibit formation of undesired 2,3,3-tribtromo-2-alkylalkane, on a molar basis, can be from about 100:1 to about 1:1, preferably from about 50:1 to about 20:1.

The reaction herein is simply effected by bringing together the 2-bromo-2-alkylalkane, bromine and HBr while maintaining the reaction system substantially anhydrous, preferably by using substantially anhydrous components. The components of the reaction system are miscible in each other. The reaction conditions are not critical. Thus, the temperature can be maintained in a range of about 31 30° to about 100° C., preferably from about 0° to about 50° C. Any pressure sufficient to maintain HBR in the reaction system at reaction temperature will suffice, for example, from about atmospheric to about 1000 pounds per square inch gauge, preferably from about 100 to about 500 pounds per square inch gauge. A reaction period of about 5 minutes to about 2 hours, preferably in the range of about 10 to about 60 minutes, will suffice.

The desired 2,3-dibromo-2-alkylalkane can be recovered from the reaction system in any suitable manner. A convenient procedure involves bringing the reaction system to atmospheric pressure and temperature and then subjecting the same to distillation conditions. The components will come off in the following order and can be recovered as desired: HBr, bromine, the monobromoalkane, the desired dibromoalkane and, finally, whatever tribromoalkanes that may also have been produced.

The process herein can be further illustrated by the following.

EXAMPLE I

To a 300-milliliter pressure glass reactor equipped with a magnetic stirrer and a thermowell, which had been cooled below 0° C., there was added 46.7 grams of tertiary amyl bromide and 15.9 grams of bromine. The reactor was connected by a rubber O-ring seal to a manifold having a pressure gauge and a connection to an anhydrous hydrogen bromide cylinder. HBr was added to the reactor until the pressure therein rose to 140 pounds per square inch gauge and the temperature rose to 45° C. At the end of 45 minutes the pressure was released and a test sample taken. A gas liquid chromatographic analysis of the reaction mixture showed 76.4 mol per cent 2-bromo-2-methylbutane, 22.6 mol per cent 2,3-dibromo-2-methylbutane and 1.0 mol per cent 2,3,3-tribromo-2-methylbutane. The reaction product was again cooled to below 0° and 20.7 grams of bromine was added thereto. After reassembly, anhydrous HBr was again added to the reaction system until the pressure reached 140 pounds per square inch gauge and the reaction mixture 45° C. Altogether 15.6 grams of HBr was added to the system during the course of this run. After 1 hour the pressure was released and the product was analyzed by gas liquid chromatography and found to contain 37.4 mol per cent 2-bromo-2-methylbutane, 60.0 mol per cent, 2,3-dibromo-2-methylbutane and 2.6 mol per cent 2,3,3-tribromo-2-methylbutane. Thus, efficiency to desired 2,3-dibromo-2-methylbutane was 95.8 mol per cent.

EXAMPLE II

To a stirred monel autoclave which had been cooled to below 0°, there was added 110.2 grams of 2-bromo-2-methylbutane and 69.0 grams of bromine. The autoclave was sealed, stirrer started and HBr added while the reactor was warmed to 35° C. Altogether 17.6 grams of HBr was added to the reaction system. After 1 hour at 35° C. and 345 pounds per square inch gauge, the pressure was released and the product analyzed by gas liquid chromatography. The results obtainied are shown below as Run No. 1 in Table I. Additional runs similarly made are also tabulated in Table I.

From the above it can be seen that when a 2-bromo-2-alkylalkane is brominated in a substantially anhydrous system in the presence of HBr desired 2,3-dibromo-2-alkylalkane is obtained with but small amounts of undesired 2,3,3-tribromo-2-methylbutane.

Obviously, many modifications and variations of the invention, as hereinabove set forth, can be made without departing from the spirit and scope thereof, and therefore only such limitations should be imposed as are indicated in the appended claims.

We claim:

1. In a process wherein a 2-bromo-2-alkylalkane is reacted with bromine to obtain a 2,3-dibromo-2-alkylalkane and a 2,3,3-tribromo-2-alkylalkane, said reactants being miscible in each other, the improvement which comprises inhibiting formation of said 2,3,3-tribromo-2-alkylalkane by carrying out said process by stirring the 2-bromo-2-alkyl-alkane, bromine and HBr under substantially anhydrous conditions and under sufficient pressure to maintain the HBr in the reaction system, the reaction temperature being in the range of about −30° to about 100°C., the reaction time is from about 5 minutes to about 2 hours, the molar ratio of said 2-bromo-2-alkyalkane to bromine is in the range of about 100:1 to about 1:1 and the molar ratio of HBr to said 2-bromo-2-alkylalkane is in the range of about 100:1 to about 1:1.

2. The process of claim 1 wherein 2-bromo-2-alkylalkane is 2-bromo-2-methylbutane.

3. The process of claim 1 wherein the reaction temperature is in the range of about 0° to about 50°

4. The process of claim 1 wherein the reaction pressure is in the range of about atmospheric to about 1000 pounds per square inch gauge.

5. The process of claim 1 wherein the reaction pressure is in the range of about 100 to about 500 pounds per square inch gauge.

6. The process of claim 1 wherein reaction time is from about 10 to about 60 minutes.

7. The process of claim 1 wherein the molar ratio of said 2-bromo-2-alkylalkane to bromine is in the range of about 50:1 to about 20:1.

8. The process of claim 1 wherein the molar ratio of HBr to said 2-bromo-2-alkylalkane is in the range of about 50:1 to about 20:1.

TABLE I

| Run No. | Charge | | | Temp. °C. | Time, Hours | HBr Pressure Pounds Per Square Inch Gauge | Product Composition in Mol Per Cent | | | Efficiency to 2,3-Dibromo-2-Methyl-Butane, Mol Per Cent |
|---|---|---|---|---|---|---|---|---|---|---|
| | 2-Bromo-2-Methyl Butane, Grams | Bromine, Grams | HBr, Grams | | | | 2-Bromo-2-Methyl-Butane | 2,3-Dibromo-2-Methyl-Butane | 2,3,3-Tri-Bromo-2-Methyl-Butane | |
| 1 | 110.2 | 69.0 | 17.6 | 0–35 | 1 | 0–345 | 52.9 | 46.5 | 0.6 | 98.7 |
| 2 | 110.5 | 100.2 | 15.5 | 0–30 | 2 | 0–325 | 30.8 | 66.0 | 3.2 | 95.4 |
| 3 | 110.1 | 100.5 | 15.1 | 0–34 | 1¾ | 0–320 | 27.9 | 69.0 | 1.7 | 97.6 |
| 4 | 72.5 | 25.3 | 16.2 | 0–30 | 1½ | 0–270 | 70.6 | 25.1 | 0.4 | 98.4 |
| 5 | 74.5 | 27.3 | 15.3 | 0–30 | 1 | 0–270 | 71.1 | 28.5 | 0.4 | 98.6 |

* * * * *

UNITED STATES PATENT OFFICE
CERTIFICATE OF CORRECTION

PATENT NO. : 3,876,715
DATED : April 8, 1975
INVENTOR(S) : John G. McNulty, Glen A. Russell, and William L. Walsh It is certified that error appears in the above-identified patent and that said Letters Patent are hereby corrected as shown below:

COL. 1, line 7, after a "2,3-dibromo-12-alkylalkane", should read -- 2,3-dibromo-2-alkylalkane --.

COL. 2, line 36, after undesired "2,3,3-tribtromo-2-alkylalkane", should read -- 2,3,3-tribromo-2-alkylalkane --.

COL. 2, line 46, after about "31 30°", should read -- -30° C. --.

COL. 2, line 63, after whatever "tribromoalkanes", should read -- tribromoalkane --.

COL. 4, line 29, after wherein "2-bromo-2-", should read -- said 2-bromo-2- --.

COL. 4, line 32, after about "50°" should read -- 50° C. --.

Signed and Sealed this twenty-ninth Day of July 1975

[SEAL]

Attest:

RUTH C. MASON
Attesting Officer

C. MARSHALL DANN
Commissioner of Patents and Trademarks